Feb. 9, 1960  G. N. BURKHART, JR  2,924,385
AUTOMATIC DEAD-RECKONER POSITION INDICATOR
Filed Feb. 8, 1947  5 Sheets-Sheet 3
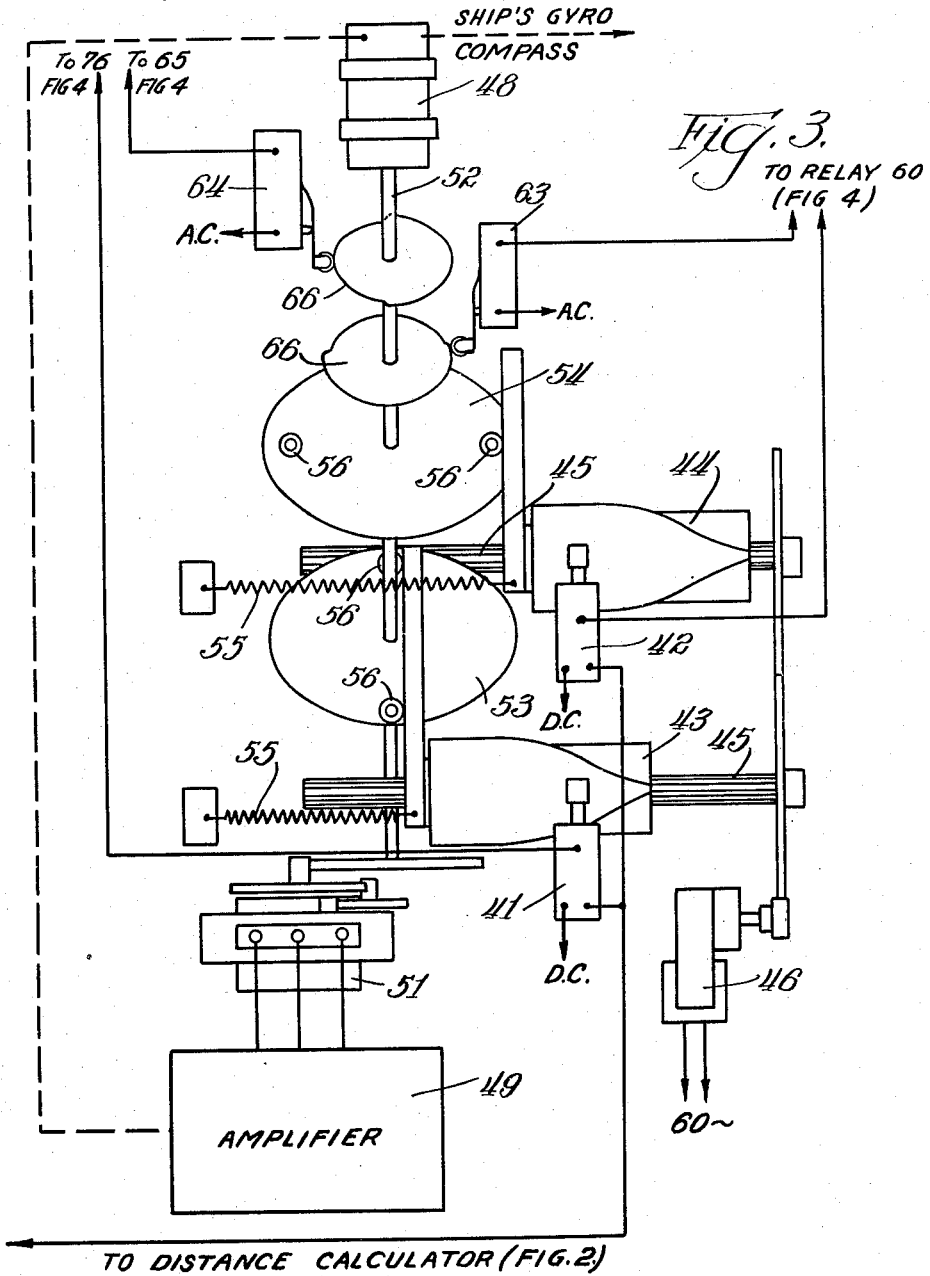

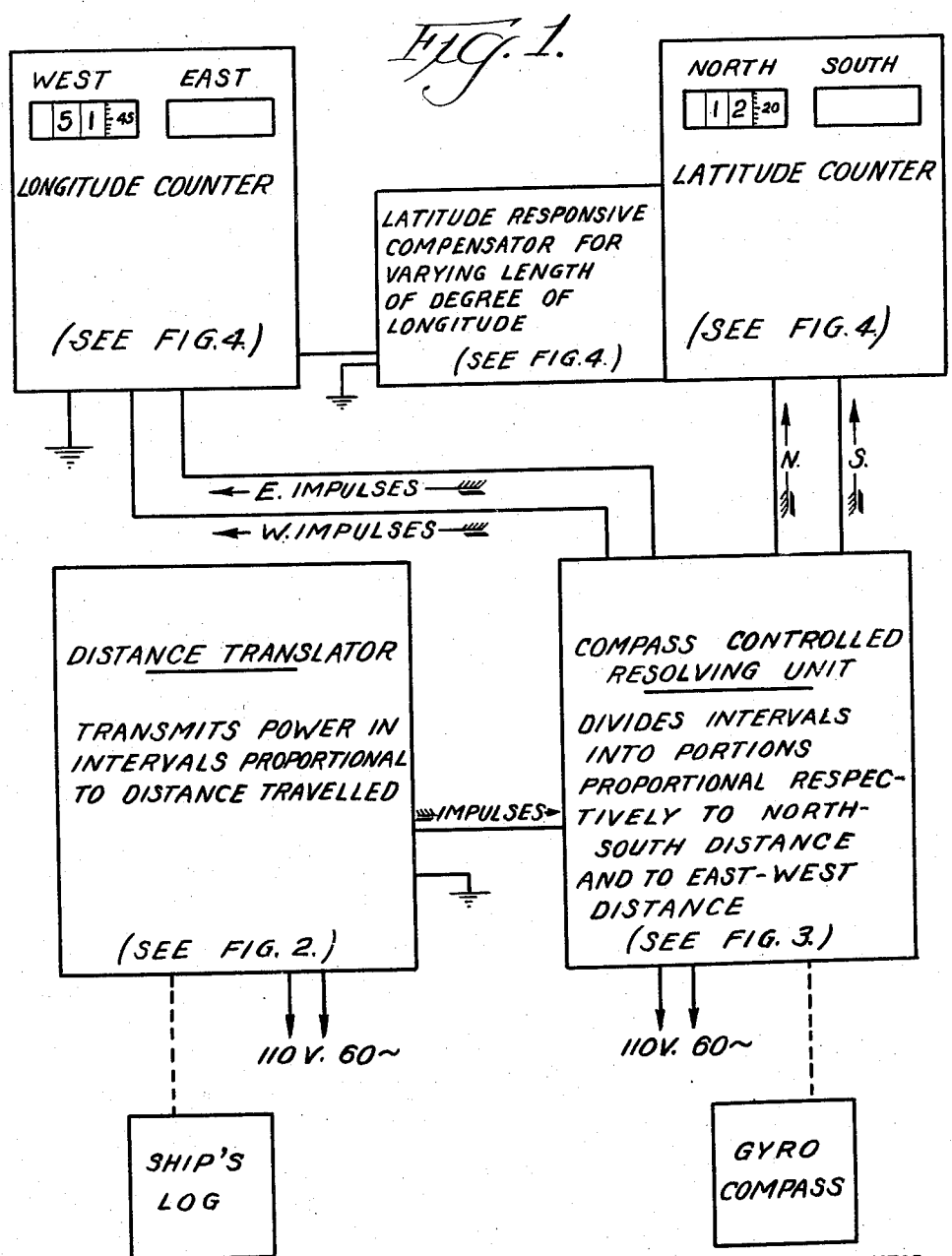

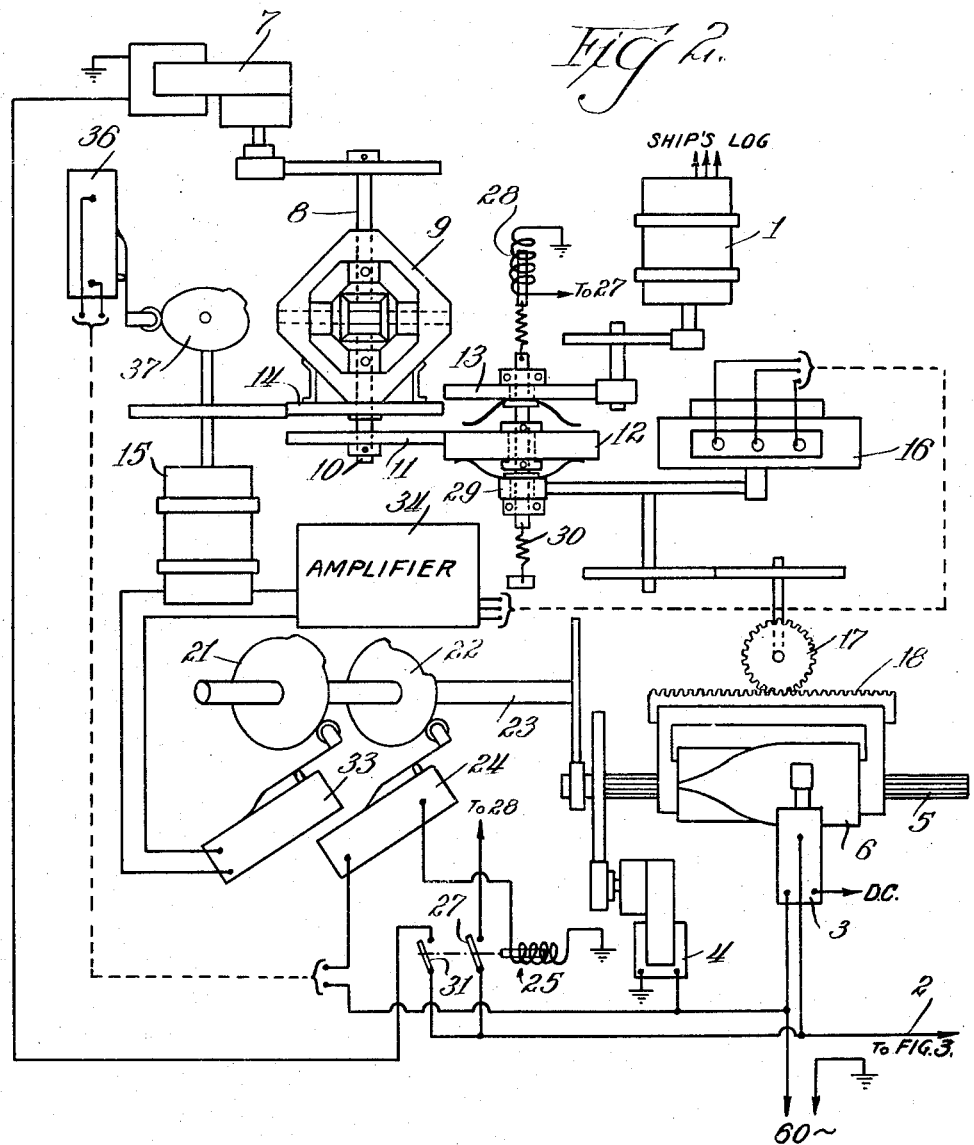

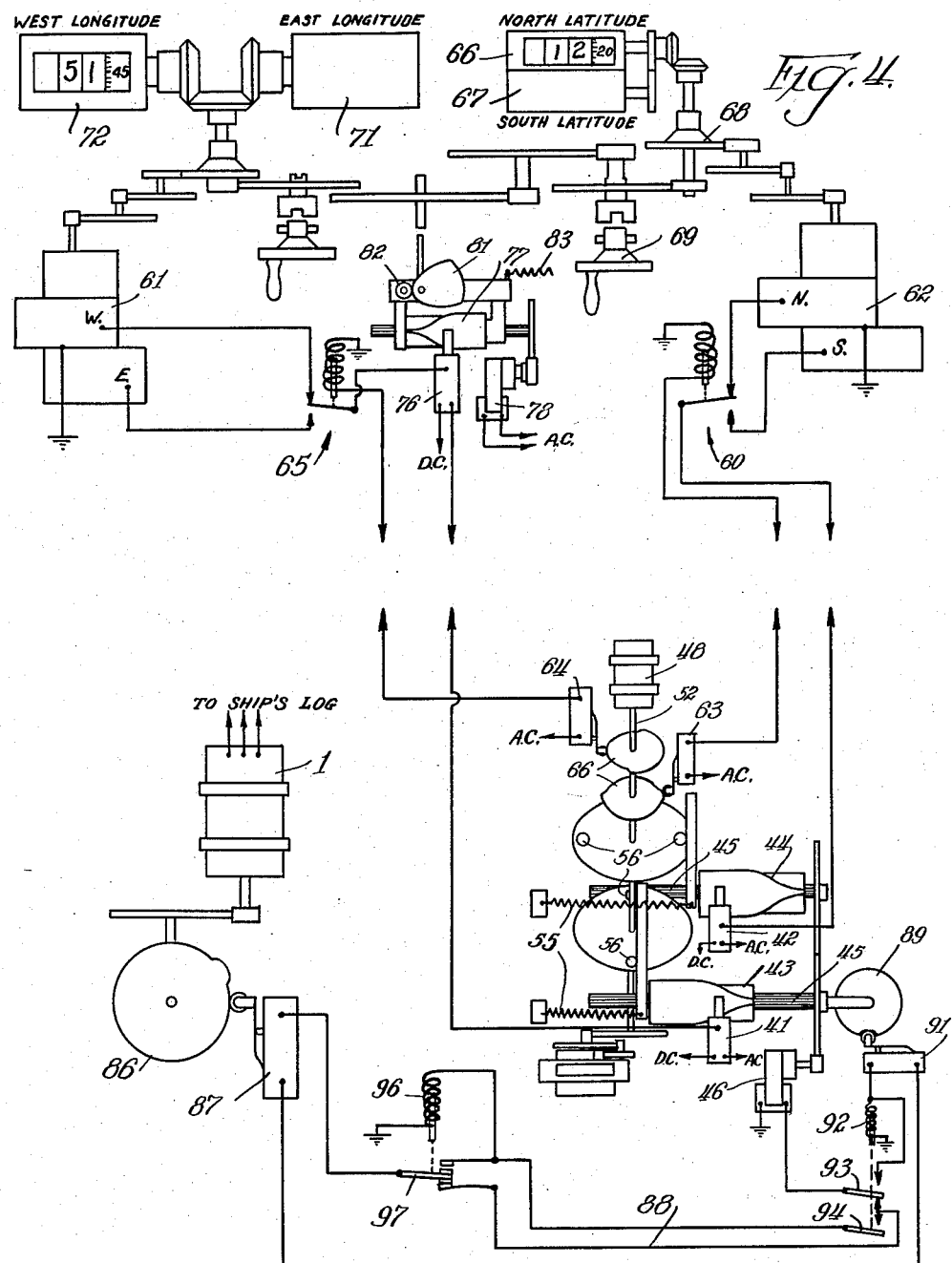

Feb. 9, 1960  G. N. BURKHART, JR  2,924,385
AUTOMATIC DEAD-RECKONER POSITION INDICATOR
Filed Feb. 8, 1947  5 Sheets-Sheet 5
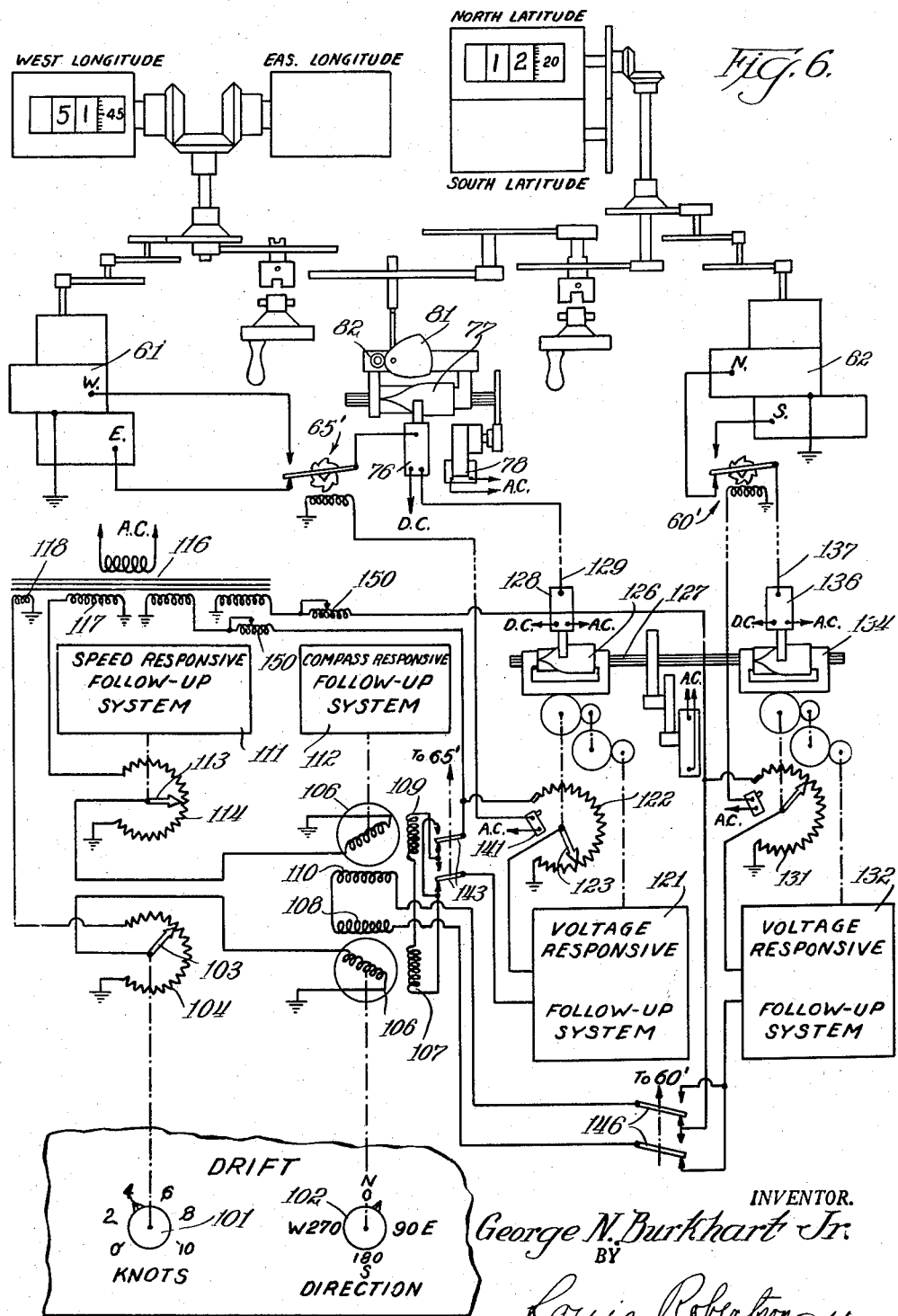
INVENTOR.
George N. Burkhart Jr.
BY
Louis Robertson Att'y.

United States Patent Office 2,924,385
Patented Feb. 9, 1960

2,924,385

AUTOMATIC DEAD-RECKONER POSITION INDICATOR

George N. Burkhart, Jr., Lafayette, Ind., assignor, by mesne assignments, to Duncan Electric Company, Inc., Lafayette, Ind., a corporation of Indiana Application February 8, 1947, Serial No. 727,422

5 Claims. (Cl. 235—188)

A ship's position on the ocean is indicated by a statement of its latitude and longitude. Its latitude is the number of degrees north or south from the equator. Its longitude is the number of degrees east or west from the Greenwich meridian. To plot a ship's course on a map while it moves in directions other than due north, south, east, or west is a difficult and time-consuming task, and many errors are made. There is considerable need for an apparatus which will constantly indicate the latitude and longitude of a ship.

Perhaps the only method which is at present practical for indicating the position of a ship continuously and automatically is by dead-reckoning. Dead-reckoning, as practiced by a navigator, consists in plotting the course the ship follows from the starting point which, of course, is known. If it starts from a starting point of a certain latitude and a certain longitude and travels for three hours on a straight course at a given rate of speed, the navigator can determine with fair approximation the latitude and longitude of its new position.

There have been proposals heretofore for an automatic apparatus for constantly performing the dead-reckoning calculations and providing an instantaneous indication at all times of the ship's position. At least one of these proposals has been in use but the apparatus required was so large and expensive as to be practical for very few ships. Furthermore it had some functional inadequacies.

An object of the present invention is to provide an automatic dead-reckoning position indicator, which is functionally more satisfactory than any such apparatus previously known, and is so much simpler and less expensive that it will be practical for use on a much larger number of ships.

Additional objects and advantages of the invention will be apparent from the following description and from the drawings in which Fig. 1 is a diagrammatic representation of the entire apparatus;

Figs. 2, 3 and 4 are diagrammatic representations of successive parts of the apparatus as indicated in Fig. 1;

Fig. 3A is a vector diagram for explaining Fig. 3;

Fig. 5 is a diagrammatic view of a modified form of the invention;

Fig. 6 is a diagrammatic representation of another modified form of the invention.

*General principles of operation*

The general principles of operation of the form of the invention illustrated in Figures 1 to 4 can best be explained with reference to Figure 1.

The ship's log is a device which measures movement of the ship through the water. It might, for example, be operated by a propeller turned by the water as the ship moves.

According to this invention, the log is coupled to a distance translator which translates the rotation of the ship's log into impulses of a length proportional to the speed of the ship. Thus in any given period of time, the total duration of all impulses added together is proportional to the distance travelled.

These impulses are transmitted to a compass-controlled resolving unit. The resolving unit follows the movements of the ship's gyro-compass and automatically resolves the total distance travelled into components in the four primary directions, north, south, east and west.

The north and south components of the impulses are delivered to a latitude counter and drive the motor of this counter in one direction or the other, to indicate north or south movement. The motor is a synchronous motor and is driven for exactly the length of time of the duration of the north or south components of the impulses and hence it drives the counter to indicate the change of latitude corresponding to the distance represented by the duration of these impulses.

The east and west components of the impulses are delivered from a resolving unit to a longitude counter and likewise drive that counter, in one direction or the other. However, since the counters represent degrees of longitude rather than miles of movement, it is necessary in this instance to make a correction for the varying length of degrees. Everyone is familiar with the fact that on a globe and on some types of maps the vertical (longitude) lines converge towards the poles. Although the lines get closer together in miles, they are the same number of degrees apart. In other words, a hundred miles eastward travel must run the longitude counter to indicate a travel of more degrees if this hundred miles is farther north than it is at the equator.

According to the present invention, the necessary variation in the operation of the longitude counter is automatically accomplished by connecting the circuit of the longitude counter motor through a compensator which is driven by the latitude counter so that a varying portion of the east or west impulses will be cut off by a contact device in the compensator. This is described in detail in connection with Fig. 4.

With this general explanation of the principles of operation, a description of the units already mentioned is in order.

*Distance translator*

The ship's log represented diagrammatically at the bottom of Fig. 1 drives or includes a synchrogenerator which is connected to synchromotor 1 in Fig. 2. The nature of these devices is already well-known. The rotor of the synchromotor accurately duplicates the movement imposed on the rotor of the synchrogenerator by the ship's log which, as previously mentioned, may be driven by a propeller actuated by the water through which the ship is passing. The purpose of the distance translator shown in Fig. 2 is to transmit to the remainder of the apparatus impulses of a duration proportional to the ship's speed or distance travelled in successive periods.

The impulses are transmitted over wire 2 by a microswitch 3 which connects the wire 2 to a suitable alternating current power supply, conventionally 115 volt, 60 cycle. To operate the microswitch 3 with timed impulses, a synchronous motor 4 constantly connected to the power supply rotates a spline shaft 5 on which a cam cylinder 6 is slidably mounted. This cam is of such nature that as it moves from one extreme position to the other, the time which it holds the switch 3 actuated during each revolution will increase steadily from zero. In order that the impulses will be proportional to the speed of the ship, it is now necessary that the cam 6 be moved along the shaft 5 accurately as the speed of the ship varies. In general, this is accomplished by comparing the speed represented by the duration of the impulses from the switch 2 with the true speed represented by the synchromotor 1 and correcting the position of cam 6 to overcome any discrepancy.

Inasmuch as the speed represented by the impulses is ultimately measured by the amount they drive a synchronous motor in Fig. 4, the speed which these impulses represent can be determined in Fig. 2 in the same manner. Thus the switch 3 is connected in a manner to be described to synchronous motor 7 which drives shaft 8 through suitable spur gears. Shaft 8 drives one side of a differential unit 9, the other side of which is driven by shaft 10 which in turn is driven by gears 11 and 12, the latter being connected during the period of comparison with gear 13 which is constantly driven by the synchromotor 1.

If the position of cam 6 corresponds to the speed of synchromotor 1, the shafts 8 and 10 will turn the same distance during the period of comparison and the differential ring 14 will end in the same position as that in which it started. If the speed is different than that represented by the position of cam 6 the differential ring or frame 14 will have been turned a net amount proportional to the discrepancy.

At the end of the period of discrepancy, a control transformer 15 will detect the discrepancy and cause energization of a motor 16 which will turn in the proper direction to correct the discrepancy and continue turning until the control transformer 15 indicates that the differential ring 14 has been returned to its normal position. In returning the ring 14 to its normal position, the motor 16 will also correct the position of cam 6, the motor 16 driving a pinion 17 which meshes with rack 18 on the frame which positions the cam 6 on the shaft 5.

The comparison and restoring periods are successively established and suitable connections made under influence of cams 21 and 22 on shaft 23, which is driven by synchronous motor 4 as through reduction gearing from the spline shaft 5. It has been found satisfactory for the shaft 23 to be driven at 1/5 of the speed of the shaft 5, shaft 23 rotating at 4 r.p.m. and shaft 5 at 20 r.p.m.

The cam 22 operates a microswitch 24 to energize a relay 25 during the comparison period which may be 12 seconds in each 15. One contact 27 of relay 25 energizes solenoid 28 which operates a double clutch mechanism, as by shifting spur gear 12, for example, to disengage spur gear 12 from a friction clutch carried by gear 29 and engage it to one carried by gear 13. This establishes the driving connection between synchromotor 1 and shaft 10 of the differential.

At the same time, contact 31 of relay 25 connects the synchronous motor 7 to switch 3 so that motor 7 will drive shaft 8 an amount corresponding to the total duration of the various impulses transmitted by switch 3 over wire 2.

At the end of the twelve seconds, when the comparison of the intermittent rotation of the shaft 8 with the constant rotation of the shaft 10 in the same period has been completed, cam 22 opens microswitch 24 de-energizing relay 25 and discontinuing the rotation of both shafts 8 and 10. The rotation of shaft 8 is discontinued by de-energizing motor 7 and rotation of shaft 10 is discontinued by disengaging gear 12 from gear 13 and engaging it to gear 29, this being accomplished by the clutch-biasing spring 30 when the solenoid 28 is de-energized.

Immediately thereafter, cam 21 actuates microswitch 33 to connect the control transformer 15 to a suitable amplifier 34. As described in detail in Patent No. 2,537,027, resulting from my copending application, Ser. No. 727,421, the amplifying circuit will control motor 16 to cause it to rotate in the proper direction to restore the differential ring 14 to its normal position. The stator winding of control transformer 15 is energized by a constant A.C. source, a stationary field being desired instead of a rotating field as in Patent No. 2,537,027.

The switch 33 is operated to open the circuit between control transformer 15 and amplifier 34 before the switch 24 is actuated to start the next comparison period, closing it again for the next restoring period. Two and a half seconds have been found an adequate time for the duration of the restoring period.

If the control transformer 15 should be turned more than 180° from its normal position, it would cause the motor 16 to rotate in the wrong direction. This is prevented by providing a limit switch 36 which is operated by cam 37 driven by the shaft of control transformer 15. As the rotor of the control transformer 15 and the cam 37 approach the 180° position, switch 36 is actuated to break the circuit by which switch 24 actuates relay 25. When this occurs, the comparison interval will be shortened to less than the usual twelve seconds. Since not all the speed discrepancy will have been detected by the differential unit 13, the cam 6 will only be moved part of the distance it should have been moved. There will, therefore, still be a speed discrepancy which will be detected in the next comparison interval, this resulting in further movement of the cam 6 on shaft 5. This operation of the limit switch and the resulting incomplete movement of cam 6 will only occur under very exceptional circumstances as if the entire apparatus is first turned on after the ship has acquired considerable speed. The 15 second delay caused by the limit switch is quite negligible compared to any ordinary voyage of several hours or days.

Ordinarily the variations in the ship's speed will be small enough so that the cam 6 will be quite accurately positioned along the shaft 5 in accordance with the speed. Accordingly, the duration of the impulses transmitted over wire 2 will be quite accurately proportioned to the ship's speed, and the total duration of the impulses during a certain time will be accurately proportioned to the distance travelled during that time.

Resolving unit

The necessity for the resolving unit can best be described with reference to Fig. 3A. If a ship travels a given distance in a given direction indicated by the vector line AB, it will have travelled eastward the distance AC and northward the distance CB. In short, the vector AB is resolved into its components AC and CB. The purpose of the resolving unit is to resolve the distance impulses received over wire 2 into components corresponding to the east-west component AC and the north-south component CB.

In Fig. 3, the resolving is accomplished by an east-west switch 41 and a north-south switch 42 operated, respectively, by shiftable cams 43 and 44. The cams 43 and 44 are slidable on spline shafts 45 which are driven constantly by a synchronous motor 46. The position of the cams on the shafts determines the proportion of time which the respective switches are closed.

The positions of the cams 43 and 44 on their shafts 45 is controlled in accordance with the direction in which the ship is moving. To this end, a control transformer 48 is connected to a synchrogenerator driven by the ship's gyro-compass, and its rotor windings, through an amplifier 49, control a reversible motor 51 which drives shaft 52 with which the rotor of control transformer 48 rotates. The amplifier 49 and the motor 51 are similar to the amplifier 34 and motor 16 of Fig. 2. This is substantially the arrangement shown in Patent No. 2,537,027 and causes the shaft 52 to duplicate quite accurately the movements of the gyro-compass.

Fastened on the shaft 52 are disks 53 and 54 which actuate, respectively, cams 43 and 44. The construction is the same in both instances. The cams are urged in one direction by springs 55 and moved in the opposite direction by studs 56 which are preferably in the form of ball-bearing assemblies, the outer race-rings forming the faces of the studs. The studs 56 on the two disks are oriented 90° apart and are so positioned on shaft 52 that if the ship's course is due east or west, the studs will be in the positions shown. In this position, the cam 43 would be at the extreme left of its movement and the cam 44 at the extreme right of its movement. This would result in leaving the switch 41 closed for transmitting impulses from wire 2 at all times or a maximum time, and not connecting wire 2 through switch 42 at all. As the ship changes its course, the cam 43 will be displaced along the spline shaft 45 from its zero position an amount proportional to the sine of the ship's course (in terms of degrees around the compass eastwardly from north). The distance of the cam 44 from its zero position will be proportional to the cosine of the ship's course. The zero position is that at which no impulses are transmitted by the associated switches.

If, as a result of mechanical limitations, the cams 43 and 44 cannot be moved to a position where they close their respective switches all of the time, it is merely necessary to compensate for this fact by the gear ratio chosen for the counters of Fig. 4. In the apparatus which has been constructed the cams had 5/6 of their theoretical full movement, although not even this much is shown in the diagrammatic drawings.

The cams 43 and 44 are linear cams having a uniform pitch or lead so that a given amount of movement of the cam along the spline shaft 45 will always cause the same change in time during which the associated switch is closed. It follows, therefore, that the impulses received over wire 2 are resolved into north-south and east-west components in proportion to the cosine and sine of the course, respectively. All of the cams of this type referred to herein may be identical, the illustrations being only diagrammatic.

The east-west component impulses drive a motor 61 (Fig. 4) and the north-south component impulses drive a motor 62. Of course, it is necessary to drive each of these motors in opposite directions. Thus, the motor 61 will be driven in one direction for an eastward movement and in the other direction for a westward movement. The direction which motor 62 is driven is determined by reversing relay 60 which is controlled by reversing control switch 63, controlled by one of cams 66. If the ship is proceeding northerly (in any direction north of east or west), switch 63 will have been actuated to actuate relay 60 to connect resolving switch 42 with the "north" terminal N of motor 62. If the ship is moving southerly, the "south" terminal S will be connected with resolving switch 42. Switch 64 and reversing relay 65 are controlled in like manner for easterly or westerly movements.

Thus it is seen that the impulses received by the resolving unit over wire 2 are resolved into 4 possible components—one for each of north, south, east, and west.

North-south (latitude) counter

The north and south components of the impulses are transmitted from switch 42 in Fig. 3 through the contacts of relay 60, Fig. 4 to either the N or S terminal of motor 62 in Fig. 4. Whenever an impulse is transmitted through the N terminal, the motor 62 runs in one direction. When it is transmitted through the S terminal, the motor 62 runs in the opposite direction. The motor 62 drives north and south latitude counters 66 and 67 in opposite directions through the gearing illustrated. North of the equator, the north latitude counter will be used and the other may be covered over. There is no danger of reading the wrong counter since its reading will always be in the 900's whereas 90 is the maximum latitude. If desired, the hundreds ring of the counter could carry a shield which would automatically obscure the counter when turned downwardly beyond zero. Otherwise, a manual shutter may be provided, shiftable to cover one or the other of the counters.

To permit setting of the counters, a friction clutch 68 is provided in the drive between motor 62 and the counters 66 and 67, and a crank 69 is provided which can be engaged to the gearing to drive the counters by hand. At the start of any trip, the crank 69 will be operated to set the counters to the known starting latitude.

The counters may be of any well-known four dial construction, the right hand dial reading from "0" to "60" minutes. Of course, each dial makes one revolution for each advance of the next dial by one figure.

East-west (longitude) counter

The counter and its drive are identical with the north and south counter and its drive. Thus, the counter 71 indicates east longitude; and the counter 72, west longitude. In the event of crossing the Greenwich meridan, the longitude counter which had been uncovered would be covered and the other one would thereafter be used. It might be noted, however, that in crossing the 180th meridian, it would be necessary to turn the counters by hand to start the other counter at 180. However, on apparatus intended primarily for the Pacific Ocean the dials could be re-arranged so that both would read 180° simultaneously, and resetting on passing the 180th meridian would not be necessary.

Latitude compensator

As previously mentioned, a hundred miles of travel eastward or westward represents more degrees of longitude when remote from the equator than at the equator. Therefore, in order for the longitude counters to read accurately, it is necessary to compensate for this varying length of the degrees. As shown in Fig. 4, this is accomplished by connecting the motor 61 through switch 76 which is controlled by compensating cam 77. This cam is constantly driven by synchronous motor 78 and its position on spline shaft 79 is determined by latitude cam 81. This cam is geared to the latitude counters 66 and 67 and its position, therefore, always corresponds to the latitude of the ship. A cam follower roller 82 bears against cam 81 under the influence of biasing spring 83. When the ship is at the equator, the cam 81 will be centered with respect to follower 82 so that the cam 77 will be as far to the right as it ever moves. As the ship departs from the equator in either direction, the cam 81 will be rotated to shift the cam 77 toward the left thus causing the longitude counting motor 61 to be energized a larger proportion of the time that impulses are available from the east-west switch 64. It is apparent that proper shaping of the cam 81 will exactly compensate for the varying lengths of degrees as the ship moves away from the equator. The cam should be shaped to compensate for the actual shape of the earth, not a true sphere. The earth is somewhat flattened adjacent the poles.

It is not necessary for the cam to compensate for latitudes close to the poles since ordinary ships never go to such extreme latitudes. In fact, compensation for about 70° latitude will usually be adequate. Of course, if a ship wanders slightly beyond the latitude for which compensation is provided, the error will be minor since it is only the additional compensation which is lost.

Every switch that is normally used to stop any of the motors is preferably a double-throw switch adapted, as illustrated, to supply D.C. to the motor, when it cuts off the A.C., for braking. The D.C. voltage should be such that the motors will have exactly the same amount of overrun in stopping as they have lag in starting.

For the convenience of anyone practicing the invention, it is believed desirable to give some technical data even though such person may prefer to depart widely from this data and even though some departure from it would be necessary to take care of speeds in excess of 25 knots, the maximum speed for which the apparatus having the following data was designed.

The apparatus was designed for use with a ships' log which would cause the synchromotor 1 to rotate 360 revolutions per nautical mile. The synchromotor drives shaft 10 through gears having a ratio of 9 to 1.

The four cylindrical cams, such as cam 6, may be identical to those used in other types of apparatus heretofore, which had an effective linear lead of 2.718" per revolution so that a 2.718" lateral movement of the cam would change the time during which the associated switch is closed from zero per cent to one hundred per cent of the total time.

Motor 7 with its gearing is designed to drive shaft 8 at 20 r.p.m.

A motor suitable for use for the motors 16 and 51 is the Barber-Coleman Reversible Midget Induction Motor type eYAZ 3313, 115 V., 60 cycle, 50 r.p.m.

The motors for driving the various spline shafts may be "Telechron" type BC, 60 cycle, 115 v., 60 r.p.m. The gearing should be such that spline shafts 5 and 79 rotate at discordant speeds, by which is meant speeds so differently related to each other and to that of spline shafts 45, that there will be no danger that synchronization or frequent instances of coming into step will introduce a repeated and, therefore, cumulative error. The speed of 20 r.p.m. has already been mentioned for shaft 5. Spline shafts 45 rotate at slightly less than 15 r.p.m. (the gear ratio from the 60 r.p.m. drive being 28/121). Spline shaft 79 rotates at slightly over 12 r.p.m. (its gear ratio from the 60 r.p.m. drive being 24/119).

The counter motors may be "Telechron" type BX, 60 cycle, 115 v., geared to 1 r.p.m. This speed is further reduced by the illustrated gearing having a ratio of 100 to 1 for the latitude counter and 100 to 3 for the longitude counter. The synchromotor 1 and control transformers 15 and 48 may be of any suitable types. One type which is at present preferred, at least for control transformer 48, is the "Bendix" type 1-CT.

Cam 81 is shaped to displace roller 82 and cam 77 proportionally to the length of a degree of longitude at the latitude corresponding to the position of cam 81. In the apparatus mentioned, this is on the basis of switch 76 being "On" all of the time when the length of a longitude degree equals 20 miles.

The various cam-controlled switches may be the type BL-RL-2 roller type "Microswitch."

Counters similar to those shown may be located at remote positions. These need not include the latitude compensator, since one compensator may be used for all stations, the output for remote stations being controlled by the one compensator.

*Simplified modification*

In Fig. 5, a modification is shown in which most of the structure in Fig. 2 has been omitted. In this form, the synchromotor 1 drives a cam disk 86 through suitable gearing. The cam disk 86 controls a microswitch 87, closing its contacts once in each revolution. Power is thus supplied through wire 88 to start synchronous motor 46. The gearing of the various parts would be such that for each revolution of cam disk 86, the distance travelled would be accurately represented by the maximum impulse obtainable from one revolution of one of the cams 43 and 44. In effect, this impulse is transmitted from switch 87 to the resolving cams 43 and 44 by starting the motor 46.

Of course, the motor 46 must s top with cams 43 and 44 in "Off" position after one revolution regardless of any possible movement of cam 86. To this end, a cam 89 is driven by one of the shafts 45 to operate a microswitch 91. As soon as the cam 89 starts, it operates the microswitch to energize relay 92. This closes the upper contact of contact arm 93 so as to connect the motor 46 through the switch 91 so that the motor will continue to rotate through one revolution of cam 89, stopping when cam 89 releases microswitch 91, and relay 92 drops.

To guard against any possibility that the cam 86 may be rotating so slowly that at the end of the revolution of cam 89, switch 87 will still be actuated, and, therefore, restart motor 46, a special circuit is provided. When the initial movement of cam 89 actuates relay 92, lower contact 94 thereof energizes relay 96. Relay 96 attracts its contact arm 97 to its upper contact which closes a holding circuit for relay 96 through switch 87. At the same time, it disconnects wire 88 so that the switch 87 cannot again start the motor 46 until the cam 86 has released it, thus opening its contacts and de-energizing relay 96. The contacts of relay 96 may be of the make-before-break type to enture proper initial operation of relay 96, since the pick-up circuit for this relay passes through the lower contact of the relay.

It will be observed that the impulse equal to the maximum obtainable by one revolution of cam 43 or cam 44 is resolved into its components in accordance with the positions of cams 43 and 44, as was the case with the impulse transmitted over wire 2 in Fig. 3. Of course, the cam 89 must be so oriented with the cams 43 and 44 that at the end of an impulse, these cams will come to rest with the switches 41 and 42 switched to a D.C. source to brake the counter-driving motors.

The gear ratios and timing should be such that switch 87 would be actuated frequently enough so that any change of course between its actuations would not cause appreciable error. In peacetime operations, this does not have to be very frequent and operation of cam 86 by the power available in synchromotor 1, through adequate reducing gear, is believed entirely feasible. If this should not be adequate for quick wartime maneuvering, the cam 86 may be mounted directly on the shaft of synchromotor 1, or driven with gearing of smaller ratio, and a follow-up system may be provided to drive the shaft by a separate motor. This system would be substantially identical with that indicated in Fig. 3 in which 48 is synchro-transformer controlling the motor 51.

Of course more frequent operation of switch 87 by cam 86 will necessitate changes in other gear ratios.

With this form of apparatus test may show that it is necessary to specify some one or more speeds at which a ship should not be run for long periods, lest there be repeated and cumulative errors due to initiating impulses in synchronism with cam 77. This probably can be made unnecessary by driving cam 77 only when cams 43 and 44 are driven, but at discordant speeds as heretofore indicated.

*Drift-compensatnig form*

In Fig. 6 is shown a form of the invention which lends itself admirably to the inclusion of drift-compensation or reckoning. It will be understood that the actual movement of a ship is the summation of its movement through the water and the movement of the water. Thus, if the apparatus of Figs. 1 to 4 indicate that the ship has moved 100 miles northward with respect to the water, this will not accurately indicate the position of the ship if the water has also moved. If the water has moved northwards 10 miles, the ship will have moved 110 miles north. It would be very desirable for the system to take account of the drift in its dead-reckoning.

In Fig. 6, the speed and direction of drift are set up on the knobs 101 and 102, perhaps being determined from charts. In spite of adding these additional factors, the system, as a whole, is perhaps even less complicated than the system of Figs. 1 to 4.

The drift-speed knob 101 sets a contact 103 on a variable auto-transformer 104 to set up a voltage proportional to the speed of the drift.

The drift-direction knob 102 turns the rotor 106 of a rotary resolving transformer to the current position for resolving the voltage impressed on the rotor (primary coil) by transformer 104 into components corresponding to the north-south drift speed and the east-west drift speed. Thus, an east-west component voltage will be induced in secondary coil 107 and a north-south component will be induced in secondary coil 108.

At the same time and in similar manner, voltage will be induced in secondary coils 109 and 110 proportioned, respectively, to the east-west and north-south speeds of the ship in the water.

This is accomplished under the control of a speed-responsive follow-up system 111 and a compass-responsive follow-up system 112. The speed-responsive follow-up system 111 is controlled by a synchrogenerator associated with the ship's speed-measuring apparatus so as to move the contact 113 of variable auto-transformer 114 (which may be called the speed transformer) so as to set up a voltage proportional to the ship's speed, this voltage being applied to rotor 106 of a speed-resolving transformer. The rotor 106 is constantly oriented with the ship's gyro-compass by the compass-responsive follow-up system 112. The orientation is such that the rotor 106 induces in stator coils 109 and 110 voltages proportional to the ship's east-west speed and the ship's north-south speed, respectively.

Proportional relationship between the voltages of coils 109 and 110 and the voltages of coils 107 and 108 in accordance with the different speeds which they represent is ensured by virtue of the fact that both of the transformers 104 and 114 are energized by secondary coils 117 and 118 of the same transformer 116. The secondary coil 117 has more turns than the secondary coil 118 because the full scale of the transformers 114 energize by coil 117 represents perhaps 30 knots while the full scale of transformers 104 represents perhaps onyl 10 knots.

The sum of the voltages in coils 107 and 109 will represent the actual or ground speed of the ship eastwardly or westwardly. If the drift is in the same direction as the ship's course, the voltages will be of like polarity and will be added together. If the drift is in the opposite direction, the voltages will be of opposite polarity and the drift voltage of 107 will be subtracted from the main voltage of 109.

The coils 109 and 107 are connected to a voltage responsive follow-up system 121 in a circuit which also includes the part of potentiometer 122 between the contact 123 and one end thereof. The polarity of the connections should be such that the voltage derived from the potentiometer in this circuit opposes the voltage derived from the coils 107 and 109. The voltage-responsive follow-up system 121 operates to turn the contact 123 until these voltages are exactly matched so that no voltage is applied to the input circuit of follow-up system 121.

East-west impulse cam 126 which rotates constantly on spline shaft 127 is moved along this shaft in accordance with the movement of contact 123. As a result it actuates microswitch 128 to transmit impulses of alternating current over wire 129 to microswitch 76 of the latitude compensator. The duration of these impulses is proportioned to the actual east-west speed of the ship and, therefore, the total combined length of the impulses during a given time are proportional to the E-W distance travelled in that time.

In like manner, the voltages induced in secondary coils 108 and 110 cooperate with potentiometer 131 to control voltage-responsive follow-up system 132, which in turn controls contact 133 and north-south impulse cam 134 so that microswitch 136 transmits over wire 137 alternating current impulses proportioned to the actual north-south speed of the ship.

These impulses are translated into degrees of latitude and degrees of longitude as previously described in connection with the other forms of the invention; the only change (except perhaps in gear ratios) is in substitution of sequence relays 60' and 65' for ordinary relays 60 and 65, since these relays are differently controlled.

As it approaches a due-north or due-south course, the vector sum of the voltages induced in coils 107 and 109 approaches zero and the contact 123 accordingly approaches the "0" end of the potentiometer 122. The potentiometer 122 is constructed so that the contact 123 may maintain a zero resistance in the circuit with coils 107 and 109 for an appreciable movement. As the course swings past one of these cardinal compass points or major directions, a voltage begins to appear across coils 107 and 109, and since no offsetting voltage appears at potentiometer 122, further movement of the contact 123 results. This further movement actuates a microswitch 141 which energizes the sequence relay 65'. One effect of this is to reverse the direction of movement of the latitude counting motor 61 when it receives impulses from switch 128. Successive energizations of the coil of relay 65' ratchet a cam to alternate positions of its contact arms.

Contact arms 143 are part of this relay and actuation of this relay, therefore, will also reverse the connections of the pair of coils 107 and 109. This reversal of these connections is necessary so that when the course of the ship crosses the north-south direction, the voltage in coils 107 and 109 will still be opposed to the voltage impressed on their circuit by potentiometer 122. The voltage in coil 129 is reversed by rotation of the rotor 106 across the due north or due south position.

On the rare occasions when a ship turns back at the zero point toward the direction from which it had been turning, the microswitch is not actuated.

Contact arms 146 are jointly controlled with the contact arm of relay 60' as in the case of control of contact arms 143 by relays 65', and for the same reason.

Although this form of the apparatus is especially desirable because it incorporates compensation for drift, it could be used without the drift compensation, if desired.

To aid any who may desire to construct this form of the apparatus, the following additional data may be noted, although wide departures from this data may be made while still using the invention.

The transformers 104 and 114 may be the "General Radio" type 200–B, known under the name "Variac."

The speed-responsive and compass-responsive follow-up systems may each be substantially similar to that illustrated in Patent No. 2,537,027, the control device receiving the input indications from the ship's speed-indicating system or the ship's compass being a "Bendix" type 1–CT Control Transformer.

The follow-up system for controlling the potentiometers 122 and 131 may be substantially the same as that shown in Patent No. 2,537,027, although the input circuit is that shown in Fig. 6 In all of these follow-up circuits, the amplifier power must come from the same source as that which energizes the input circuits so as to provide the proper phase relationship.

The rotary transformers including rotors 106 may be the "Kollsman" type 787–01, 60 cycle, 32 v. input, two phase output. These devices are known by the name "Circutrol."

The potentiometers 122 and 131 may be the "General Radio" type 371A potentiometer 10,000 ohms.

The various driving motors may be the same as those referred to elsewhere in this application. The cylindrical cams are also the same as those referred to elsewhere, as are the switches operated by them.

The sequence relays 60' and 65' may be of a three-pole, double throw variety operating on 110 v., 60 cycle current.

In order to adjust the voltages across potentiometers 122 and 131 so that the contacts thereof will be properly positioned when matching the induced speed component voltages which are to be opposed, adjustment rheostats 150 are provided. These may be "General Radio" type 214A, 500 ohm rheostats.

The gearing in the counter drives will depend upon the ship's speed for which the apparatus is designed. Of course the gearing must be correlated with other factors. The ratio at present contemplated for the illustrated gearing in the latitude counter is 120 to 1, while that of the longitude counter is 40 to 1.

Simple contact devices could control the reversible motors of the follow-up systems if preferred, but probably some accuracy would be lost.

From the foregoing, it is seen that several forms of practical apparatus are provided for furnishing a ship's navigator a constant instantaneous reading of the ship's position, determined by automatic dead reckoning. The entire apparatus of Fig. 2 to 4 can be housed in a cabinet approximately 1½' by 2' and less than a foot thick. Its cost is within reason for any large ship.

Although the invention has been illustrated as applied only to navigation, some of its features can be used in widely different fields. For example, Fig. 2 illustrates a system for positiining a controlled member; for instance anything which may be moved with cam 6, in accordance with remote control, the position being compared with the correct position with the help of impulses controlled by cam 6. This could be used in telemetering, for example.

In the following claims, reference to the ship's movement or speed is not intended to be limited to ground speed or actual movement with respect to the earth unless ground speed or actual movement is specified. Nor is it to be deemed inconsistent with using the propeller shaft speed, with suitable correction for slippage. In Fig. 2, for example, the motor 2 could be responsive to shaft speed, in which case it might drive gear 13 through a speed changing mechanism such as a Reeve's drive controlled by the position of rack 18. Or cam 6 could be replaced by two cams, one for driving motor 7 for comparison and one for transmitting impulses over wire 2; the two cams being differently shaped to compensate for propeller slippage.

I claim:

1. Apparatus for producing two series of impulses, each series totalling in duration time a value proportional to one component of the distance travelled by a ship carrying the apparatus, including a speed potentiometer, a power source therefor, speed-responsive means for displacing the potentiometer contact from the zero position in proportion to the speed to establish a speed-voltage, a resolving transformer including a rotor energized by the speed voltage and stator coils displaced 90° for inductively resolving the speed voltage into component speed voltages for the north-south and east-west directions respectively, compass-controlled means for turning the rotor of the transformer in accordance with the ship's course, a comparing potentiometer connected to each of said coils, energized by the same source as the speed potentiometer and controlled by means responsive to the relative voltage of said coil and the comparing potentiometer contact to move the comparing potentiometer contact until the voltages match, and means controlled jointly with the comparing potentiometer contact for establishing impulses of a duration proportional to the displacement of the comparing potentiometer contact from the zero position.

2. Apparatus for producing two series of impulses, each series totaling in duration time a value proportional to one component of the distance travelled by a ship carrying the apparatus, including a speed potentiometer, a power source therefor, speed-responsive means for displacing the potentiometer contact from the zero position in proportion to the speed to establish a speed-voltage, a resolving transformer including a rotor energized by the speed voltage and stator coils displaced 90° for inductively resolving the speed voltage into component speed voltages for the north-south and east-west directions respectively, compass-controlled means for turning the rotor of the transformer in accordance with the ship's course, a comparing potentiometer connected to each of said coils, energized by the same source as the speed potentiometer and controlled by means responsive to the relative voltage of said coil and the comparing potentiometer contact to move the comparing potentiometer contact until the voltages match, and means controlled jointly with the comparing potentiometer contact for establishing impulses of a duration proportional to the displacement of the comparing potentiometer contact from the zero position; a drift speed potentiometer and a drift resolving transformer connected in series with a corresponding coil of the first named resolving transformer in the comparing circuits whereby upon setting the drift potentiometer and resolving transformer in accordance with the speed and direction of drift, the impulses produced will represent the ground speed of the ship.

3. Dead reckoning apparatus including north and south latitude counters, a synchronous motor driving the counters in either direction, means for controlling the direction of drive, means for delivering to the motor impulses proportional to the north-south component of ship movement, east and west longitude counters, a second synchronous motor for driving the counters in either direction, means for controlling the direction of drive, means for producing energizing impulses for the second motor proportional to the east-west component of ship movement, and compensating means driven with the latitude counters for reducing the duration of the longitude impulses as the ship approaches the equator to compensate for the increased length of longitude degrees; the apparatus for producing the impulses including a potentometer, speed-responsive means for displacing the potentiometer contact from the zero position in proportion to the speed to establish a speed-voltage, a resolving transformer including a rotor energized by the speed voltage and stator coils displaced 90 degrees for inductively resolving the speed voltage into component speed voltages for the north-south and east-west directions respectively, compass-controlled means for turning the rotor of the transformer in accordance with the ship's course, a comparing potentiometer connected to each of said coils, energized by the same source as the speed potentiometer and controlled by means responsive to the relative voltage of said coil and the potentiometer contact to move the potentiometer contact until the voltages match, and means controlled jointly with the potentiometer contact for establishing impulses of a duration proportional to the displacement of the comparing contact from the zero position.

4. Navigational apparatus including latitude indicating means, longitude indicating means, means for driving the latitude indicating means in accordance with the north-south movement, and means for driving the longitude indicating means in accordance with the east-west movement of the ship but with compensation for varying the length of latitude degrees including a compensating device and control means for this device comprising a cam driven with the latitude indicating means, having an intermediate position correlated to the equator and shaped to produce like control of the compensating device upon movement in either direction from the intermediate position, said cam being shaped to control the compensating device to compensate accurately for the decreasing length of the longitude degrees with increased latitude in accordance with the true non-spherical shape of the earth.

5. Dead reckoning apparatus including latitude counting means, a latitude motor for driving the counting means in either direction, longitude counting means, a longitude motor for driving the longitude counting means in either direction, and compass and speed responsive means for driving said motors proportionally to the latitudinal and longitudinal movements of a ship respectively and including rotative means which reaches given positions upon movement of the ship in any direction due north, due south, due east or due west, and switch means actuated by said rotative means at said positions for automatically reversing the directions of drive of the longitude motor as the ship swings through due north or due south and of the latitude motor as the ship swings through due east or due west.

References Cited in the file of this patent

UNITED STATES PATENTS

| | | |
|---|---|---|
| 1,638,417 | Sperry | Aug. 9, 1927 |
| 1,702,403 | Holmes | Feb. 19, 1929 |
| 1,915,798 | Ohmer | June 27, 1933 |
| 2,022,275 | Davis | Nov. 26, 1935 |
| 2,080,186 | Reymond | May 11, 1937 |
| 2,113,164 | Williams | Apr. 5, 1938 |
| 2,215,254 | Ryder | Sept. 17, 1940 |
| 2,314,637 | Tancred | Mar. 23, 1943 |
| 2,390,613 | Oliphant | Dec. 11, 1945 |
| 2,403,152 | Roters | July 2, 1946 |
| 2,406,836 | Holden | Sept. 3, 1946 |
| 2,425,346 | Rippere | Aug. 12, 1947 |
| 2,428,770 | Albert | Oct. 14, 1947 |
| 2,433,288 | Miles | Dec. 23, 1947 |
| 2,502,991 | Rast | Apr. 4, 1950 |

FOREIGN PATENTS

| | | |
|---|---|---|
| 558,644 | Great Britain | Jan. 13, 1944 |